Feb. 14, 1950            E. A. SALCY            2,497,518
TIRE TREAD
Filed April 1, 1947
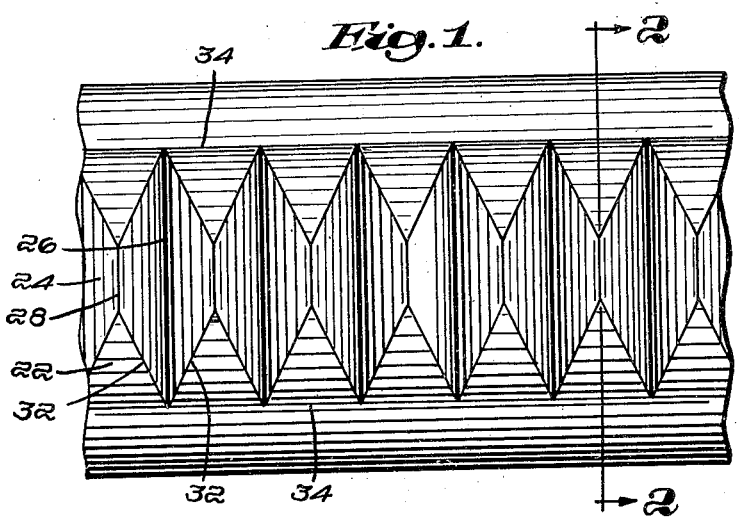
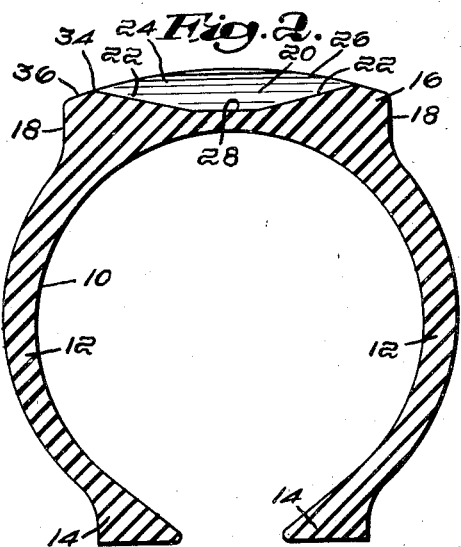 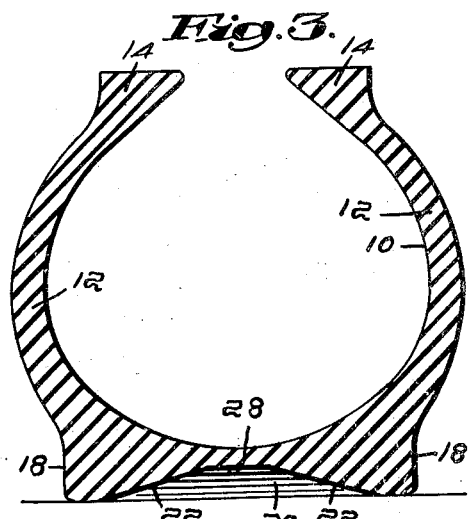
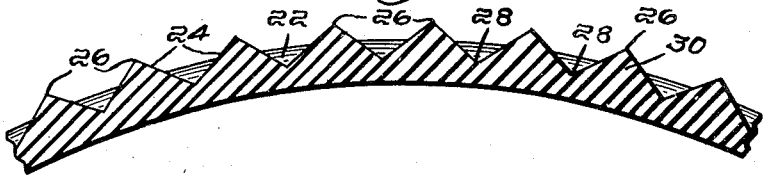
Inventor:
Enzo A. Salcy,
by Thomson & Thomson
Attorneys Patented Feb. 14, 1950

2,497,518

UNITED STATES PATENT OFFICE 2,497,518

TIRE TREAD

Enzo A. Salcy, Allston, Mass.

Application April 1, 1947, Serial No. 738,617

3 Claims. (Cl. 152—209)

This invention relates to improvements in a tire tread for pneumatic automobile tire casings.

It is an object of my invention to provide an improved anti-skid tire tread having lateral and transverse ribs forming the walls of pockets which function as suction cups to grip the road surface.

Further objects and advantages of my improvements will be more readily apparent from the following description of a preferred embodiment thereof as shown in the accompanying drawings; in which, Fig. 1 is a plan view of a portion of the tread surface of the tire;

Fig. 2 is a sectional view of the tire casing taken on the plane 2—2 in Fig. 1;

Fig. 3 is a sectional view taken through the tire casing similar to Fig. 2 but showing the tread surface under load in contact with the road surface; and Fig. 4 is a longitudinal section of a portion of the tire tread.

The tire casing 10 is of conventional construction having the side walls 12, beads 14 and a tire tread 16. The side walls 18 of the tread are designed to provide a suitable thickness of the wearing portion of the tire tread. The tread surface is formed with pockets 20 circumferentially faced around the tire. Each pocket 20 has lateral side walls 22 and transverse side walls 24. As shown in Fig. 4, the transverse side walls 24 meet at the transverse lines 26 on the tread surface and merge at the bottom of the pockets at the transverse lines 28. Thus V-shaped transverse ribs 30 are formed between each pair of pockets. The side walls 22 of the pockets begin at the top of the tread surface at points inwardly spaced from the side walls 18 of the tread and slope inwardly toward the center line of the tire and the bottom of the pockets. As shown in Figures 1 and 2, the side walls 22 do not meet at the center of the tire but are spaced apart by the line 28 where the transverse walls 24 merge. Thus, as shown in Fig. 1, the side walls 22 are substantially triangular in shape and merge with the transverse walls 24 at the lines 32. The side walls 22 merge into the top of the tread surface at the lines 34.

The portion of the tire tread surface between the lines 34 and the lateral wall 18 of the tire tread is designated 36 and forms in effect the lateral ribs which resist lateral skidding.

Fig. 3 illustrates the tire tread under load in contact with the road surface. The pockets are then somewhat closed up under compression and act as suction cups. By merging the transverse side walls 24 to form the V-shaped ribs 30, as in Fig. 4, it is possible to provide more pockets than if the pockets are spaced apart. Furthermore the V-shaped transverse ribs provide better traction.

The pockets form rectangular suction cups having inclined side walls. The pockets are preferably wider transversely of the tire than circumferentially thereof.

I claim:

1. A tire tread for a pneumatic tire casing having pockets formed therein, each pocket having V-shaped side walls sloping inwardly toward the center line of the tire and the bottom of the pocket, each pocket having transverse walls sloping toward the bottom of the pocket and merging at the bottom of the pockets between the side walls, the transverse walls forming V-shaped transverse ribs.

2. A tire tread having rectangular shaped suction cups spaced circumferentially around the tire, each pocket being substantially as wide as the tire tread surface, transverse V-shaped ribs separating the pockets and lateral ribs having inwardly sloping V-shaped walls defining the lateral sides of the pockets.

3. A tire tread for a pneumatic tire casing having rectangular shaped suction cups spaced transversely around the tire, the transverse walls of each pocket being parallel to the axis of the tire, the transverse walls of each pocket merging together at the bottom of the pockets, said transverse walls forming V-shaped ribs separating the pockets, said pockets having lateral triangular shaped walls inwardly sloping toward the bottom of the pockets.

ENZO A. SALCY.

REFERENCES CITED

The following references are of record in the file of this patent:

UNITED STATES PATENTS

| Number | Name | Date |
|---|---|---|
| 917,733 | Kempshall | Apr. 6, 1909 |
| 1,377,283 | Schenuit | May 10, 1921 |

FOREIGN PATENTS

| Number | Country | Date |
|---|---|---|
| 24,576 | Great Britain | Apr. 13, 1912 |
| 108,486 | Sweden | Jan. 21, 1939 |